United States Patent Office 2,934,429
Patented Apr. 26, 1960

2,934,429

SILVER RECOVERY PROCESS

Richard M. Barrer, Bromley, England, and James D. Falconer, Llangollen, Wales, assignors to Union Carbide Corporation, a corporation of New York No Drawing. Application June 20, 1956
Serial No. 592,503

5 Claims. (Cl. 75—118)

This invention relates to silver recovery, and comprises an ion exchange process for effecting such recovery.

Conventionally, silver is recovered from solutions by means of chemical displacement methods, wherein an active metal strip is introduced in the silver-containing solution. One active metal widely employed for this purpose is copper. Copper passes from the copper strip surface into solution, and displaces silver therefrom, and onto the strip. Also used in this connection are electrolytic methods which plate out silver. Common to all the above methods is the disadvantage that they must be followed by further refining operations, because contaminating metals present with silver often plate out with it.

Commercial ion exchange resins also have been used to remove silver cations from solution, but their selectivity is too low to render their employment economically feasible.

Departing from prior art techniques of silver recovery, the present object of the invention is to provide a process wherein a felspathoid material operates to remove silver cations from silver-containing solutions.

A further object is to provide a process of recovering silver cations from silver-containing solutions wherein silver is recovered in a form easily reduced to pure silver metal.

A still further object of the invention is to provide a process of silver recovery wherein a "getter" material having a high and specific selectivity for silver cations is used, whereby the separated silver, as extracted, is free from contaminants normally occurring therewith.

The process of the invention by means of which the above objects are attained comprises treating a silver-containing solution with the sodium form of the synthetic felspathoid sodalite, exchanging the sodium for the silver in solution, and removing the exchanged silver from the sodalite.

For the purposes of this disclosure, and in the appended claims, a felspathoid may be defined as a generally anhydrous crystalline aluminosilicate containing interstitial anions such as chloride, sulfate, carbonate or sulfide in its structure channels. The particular felspathoid employed in the present process is sodalite, either synthetic or natural occurring. As prepared, synthetic sodalite contains interstitial hydroxyl anions, and some water.

Some structural features of sodalite crystals are of significance for the present process. In the network of sodalite, channels intersect directly and are circumscribed by six membered rings. The structure may be visualized by stacking identical aluminosilicate polyhedra in 8-fold coordination. Each polyhedron contains eight 6 membered and six 4 membered rings.

Sodalite possesses an extremely high selectivity toward silver cations relative to other cations, and therefore selectively ion exchanges with silver. Extensive exchange of silver occurs from solution of sodalite crystals even when the silver concentration in solution is extremely small by comparison to that of alkali metals which may occur therewith. The resulting silver sodalite may be leached with an aqueous solution containing an exchanging cation salt, or preferably can be treated with sodium chloride to reverse the ion exchange reaction and precipitate silver chloride, which is readily reduced to pure silver metal. This latter precipitation process is disclosed and claimed in the copending application to R. M. Barrer and D. C. Sammon, Serial No. 578,596, filed April 17, 1956.

The felspathoid sodalite used in the present process was prepared hydrothermally according to the method described in J. Chem. Soc., 1561 (1952). Briefly this preparation is as follows. A gel having the composition $Na_2O \cdot Al_2O_3 \cdot 2SiO_2 \cdot xH_2O$ is contacted with a 300 mol percent excess of aqueous caustic soda at 100° C. The product is filtered and dried. The resulting material consists of spherulitic crystals of sodium sodalite having the chemical composition of

| Formula: | Weight percent |
|---|---|
| $Na_2O$ | 22.0 |
| $Al_2O_3$ | 31.2 |
| $SiO_2$ | 37.7 |
| $H_2O$ | 9.2 |

This corresponded to a composition of $$1.2Na_2O \cdot Al_2O_3 \cdot 2SiO_2 \cdot 1.7H_2O$$

In determining the suitability of sodalite for silver recovery techniques, mass action quotients were determined for the relationship: Sodium→Silver in basic sodalite at approximately 25° C. For these determinations a silver nitrate solution having a total normality of 0.009864 was used. Approximately 0.05 gram of basic sodium sodalite was weighed into a 50 ml. beaker, to which 5 ml. of silver nitrate were added. The contents were stirred and the silver ion concentration found from E.M.F. measurements at approximately 25° C. of the cell:

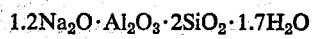

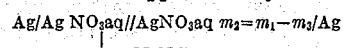

In the above relationship the right hand compartments represent the composition of the solution when exchange equilibrium is established. An agar-ammonium nitrate bridge was employed to minimize the liquid-liquid junction potential, and a Tinsley potentiometer and valve-voltmeter were used in determining the E.M.F. The obtained results, as tabulated in Table I, show the approximate validity of the mass action law with a mean value of $K=335$. It can be said that the standard free energy of exchange is considerable.

*Table I*

| Equivalent Ion Fraction of Ag in solution | Equivalent Ion Fraction of Ag in crystals | $K=\dfrac{Ag_c Na_s}{Na_c Ag_s}$ |
|---|---|---|
| 0.0002 | 0.054 | 287 |
| 0.0005 | 0.142 | 336 |
| 0.0005 | 0.194 | 480 |
| 0.0017 | 0.399 | 384 |
| 0.0026 | 0.467 | 330 |
| 0.0028 | 0.471 | 380 |
| 0.0038 | 0.553 | 328 |
| 0.0034 | 0.560 | 367 |
| 0.0051 | 0.632 | 336 |
| 0.0064 | 0.689 | 350 |
| 0.0087 | 0.742 | 328 |
| 0.0088 | 0.742 | 321 |
| 0.0145 | 0.831 | 333 |
| 0.0164 | 0.845 | 333 |
| 0.0303 | 0.909 | 320 |
|  |  | (Av.=335) |

Conducive to a better understanding of the invention, the following example describes the efficacy of synthetic sodium sodalite for removing silver cations from solution.

In this example a portion of sodium sodalite prepared as indicated above was treated with 10 ml. of 0.009846 N silver nitrate solution until the system reached equilibrium conditions. The silver content of the solution and sodalite, respectively, were analytically determined to determine to what extent the silver ions from the solution had replaced the sodium ions of the sodalite. The results indicate an essentially complete silver ion exchange with sodium ions. These results and those of various other runs using various amounts of silver nitrate solution are tabulated in Table II below.

*Table II*

| Volume of Solution of AgNO₃ taken (ml.) | Wt. of AgNO₃ present (g.) | Equiv. Cation Fraction of Ag in Crystals | Increase in wt. of Crystals (g.) | Wt. of AgNO₃ determined (g.) |
|---|---|---|---|---|
| 10 | 0.0167 | 0.054 | 0.0080 | 0.0162 |
| 15 | 0.0251 | 0.142 | 0.0131 | 0.0265 |
| 100 | 0.1673 | 0.399 | 0.0823 | 0.1665 |

The results indicated above show that the recovery of silver is practically quantitative. Where the sample is representative, as in the third instance, where a 100 ml. sample was taken, the result obtained equivalent to an error of 0.5 percent illustrates the suitability of the method of the invention for the analytical determination of silver. In using this method as a quantitative determination for silver, only a small correction factor is necessary.

The process of the invention is especially useful in removing silver cations from solutions containing silver, such as used or spent photographic fixers.

The sodalite material indicated as suitable in the practice of the invention may be either natural or synthetic.

The sodium sodalite may be incorporated also in plastic membrances capable of transferring ions under an applied electric field. The membrane may be composed of any conventional plastic material such as polyethylene, phenol formaldehyde resins, methyl methacrylate and polystyrene. A suitable composition consists of a mixture of 50 percent of sodalite and 50 percent by weight of the resin bonded together. Silver ions can be transferred across such membranes in a greater quantity from an effluent solution.

What is claimed is:

1. An improved process for recovering silver ions from aqueous solution which comprises: contacting a quantity of aqueous solution containing silver ions with a quantity of sodium sodalite; maintaining such contact until ion exchange equilibrium is established to essentially quantitatively exchange silver ions in said solution for sodium ions in said sodalite; and thereafter removing the thus exchanged silver ions from said sodalite.

2. An improved process for recovering silver ions from aqueous solution which comprises: contacting a quantity of aqueous solution containing silver ions with a quantity of a sodium form of synthetic sodalite; maintaining such contact until ion exchange equilibrium is established to essentially quantitatively exchange silver ions in said solution for sodium ions in said synthetic sodalite; and thereafter removing the thus exchanged silver ions from said synthetic sodalite.

3. An improved process for recovering silver ions from aqueous solution which comprises: contacting a quantity of aqueous solution containing silver ions with a quantity of a sodium form of synthetic sodalite; maintaining such contact until ion exchange equilibrium is established to essentially quantitatively exchange silver ions in said solution for sodium ions in said synthetic sodalite; and thereafter removing the thus exchanged silver ions from said synthetic sodalite by leaching with an aqueous solution containing an exchanging cation salt.

4. An improved process for recovering silver ions from aqueous solution which comprises: contacting a quantity of aqueous solution containing silver ions with a quantity of a sodium form of synthetic sodalite; maintaining such contact until ion exchange equilibrium is established to essentially quantitatively exchange silver ions in said solution for sodium ions in said synthetic sodalite; and thereafter removing the thus exchanged silver ions from said synthetic sodalite by treating with sodium chloride to reverse said ion-exchange reaction and precipitate silver chloride.

5. An improved process for removing silver ions from aqueous solution which comprises: contacting a quantity of aqueous solution containing silver ions with a quantity of sodium sodalite; maintaining such contact until ion-exchange equilibrium is established thereby eseentially quantitatively exchanging silver ions in said solution for sodium ions in said sodalite.

References Cited in the file of this patent

UNITED STATES PATENTS

| | | |
|---|---|---|
| 2,600,719 | Wood | June 17, 1952 |
| 2,636,852 | Juda et al. | Apr. 28, 1953 |
| 2,678,885 | Porter | May 18, 1954 |